United States Patent [19]

Kim

[11] Patent Number: 5,038,238
[45] Date of Patent: Aug. 6, 1991

[54] APPARATUS FOR OPENING AND SHUTTING A DOOR ACCESSING ADJUSTING CONTROLS TO A TAPE RECORDER

[75] Inventor: Cheon-Kuk Kim, Suweon, Rep. of Korea

[73] Assignee: SamSung Electronics Co., Ltd., Suwon, Rep. of Korea

[21] Appl. No.: 456,559

[22] Filed: Dec. 26, 1989

[30] Foreign Application Priority Data

Jun. 8, 1989 [KR] Rep. of Korea .................. 897856

[51] Int. Cl.⁵ .................................... G11B 5/008
[52] U.S. Cl. ................................ 360/96.5; 360/137; 242/199
[58] Field of Search ..................... 360/96.5, 137; 242/197-199

[56] References Cited

U.S. PATENT DOCUMENTS 4,607,301 8/1986 Iizuka .................. 360/96.5
4,623,992 11/1986 Kurosaki .................. 360/137 X Primary Examiner—A. J. Heinz
Attorney, Agent, or Firm—Robert E. Bushnell

[57] ABSTRACT

An apparatus for opening and shutting a door of an adjusting part, functions of a tape recorder being adjusted by the adjusting part, comprising: a cassette loading means for mounting and dismounting a cassette in a deck, the cassette loading means moving along a loading slot formed on one side of a housing, a door opening means being operated by the cassette loading means to open the door, a resilient means for applying the resilient force to the door, a control means for controlling the resilient force of the resilient means, a door shutting means including a button and a shutting lever. The door may be opened to adjust the picture quality or the one quality only in loading of the tape cassette, otherwise the door may not be opened. Moreover, it may be attained to protect to the adjusted state from the outside and to smoothly open and shut the door according to the present invention.

4 Claims, 3 Drawing Sheets

1

APPARATUS FOR OPENING AND SHUTTING A DOOR ACCESSING ADJUSTING CONTROLS TO A TAPE RECORDER

BACKGROUND OF THE INVENTION

This invention relates to an apparatus for opening and shutting a door, and particularily, for example, in a tape recorded, to an apparatus for opening and shutting a door to protect an adjusting part which finely adjusts a picture quality and a tone quality and so on.

Generally, the adjusting part which finely adjusts a tone quality and the like is arranged at the front side of the tape recorder. A door is provided to protect the adjusted state since adjusting knobs of the adjusting part can be easily operated only by a slight force.

However, the conventional door is always opened and shut by a slight manual action. Even a child as well as a user can open and shut easily the door and handle the adjusting knobs as he wishes. Moreover, the adjusted state readily becomes in disorder and the door must be opened to again adjust the disordered state. Accordingly, many attempts have been made to solve the problems as mentioned above, but it has not been accomplished up to now to protect and maintain the adjusting part.

SUMMARY OF THE INVENTION

It is an object of the present invention to provide an apparatus for opening and shutting a door that can protect an adjusting part and maintain the adjusted state by keeping the door of the adjusting part shut except when a tape cassette is loaded.

To achieve the above-mentioned object, an apparatus for opening and shutting a door of an adjusting part, functions of a tape recorder being adjusted by said adjusting part, comprises: a cassette loading means for mounting and dismounting a cassette in a deck, said cassette loading means moving along a loading slot formed on one side of a housing; a door opening means being operated by said cassette loading means to open the door; a resilient means for applying the resilient force to the door; a control means for controlling the resilient force of said resilient means; a door shutting means including a button and a shutting lever, said button being resiliently disposed at a supporting member of a panel on the upper end of the door, said shutting lever being connected with a hinge member formed in the lower part of said supporting member and being contacted with the inclined working surface of said link.

BRIEF DESCRIPTION OF THE DRAWINGS

These and other objects, features, and advantages of the present invention will become more apparent from the following description for the preferred embodiment taken in conjunction with the accompanying drawings, in which.

DESCRIPTION OF THE PREFERRED EMBODIMENT

Figure 1:
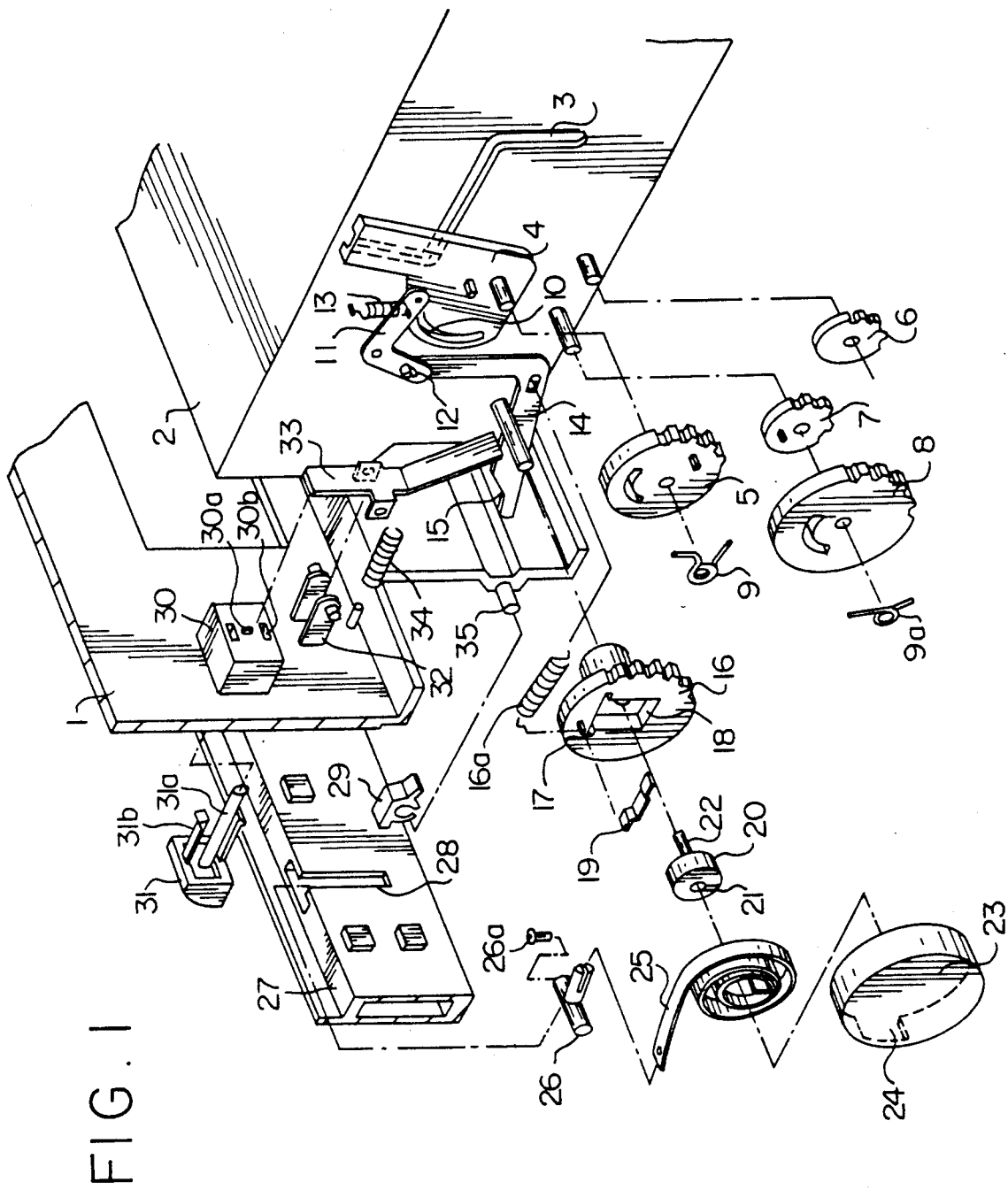
FIG. 1 is an exploded perspective view of an embodiment of the present invention.

The present invention will be now described in more detail with the accompanying drawings.

FIG. 1 to FIG. 4 show an embodiment of the present invention. A loading slot 3 is formed in one side of a housing 2 established at a panel 1. A loading arm 4 is rotatably mounted on a shaft.

Further, at the lower side of the loading arm 4, a driving gear 6 which is driven by a loading motor (not shown) is engaged with a connecting gear 5. The connecting gear 5 is concentrically formed with the loading arm 4 and is resiliently supported by a spring 9. A gear 7 is disposed at the lower side of the connecting gear 5 and engaged with the connecting gear 5. A rotating gear 8 is concentrically provided with the gear 7 and is resiliently supported by a spring 9a.

A cam 10 is formed in the loading arm 4. An operating lever 11 has a slot 12, is resiliently supported by a spring 13, and one end of the operating lever 11 is connected with the cam 10 via a pin. A link 14 with an inclined working surface 15 at one side thereof is inserted into the slot 12 of the operating lever 11.

Further, an opening gear 16 is resiliently fitted with a shaft formed on the upper part of the link 14 by a spring 16a and is engaged with the rotating gear 8. A first fixing groove 17 which is fitted with a resilient member 19 is formed in the opening gear 16 and a fixture 20 is inserted into a guide hole 18 formed at the lower portion of the first fixing groove 17.

A second fixing groove 21 and a regulating member 22 are formed with the fixture 20 and a spiral spring 25 is inserted into the second fixing groove 21. A cover 23 with an aperture 24 at a portion thereof covers the opening gear 16 and the spiral spring 25 and so on.

Moreover, a guide bar 26 is connected with the front end of the spiral spring 25 by a screw 26a and is fitted into a guide slot 28 which is formed in the inner portion of the door 27 disposed at the front part of the panel 1. An operating rib 29 is protruded at the inner side and the lower part of the door 27. The front end of the operating rib 29 is contacted with one end of the link 14 to open the door 27.

On the other hand, a through hole 30a is formed in the inner side of the panel 1 and a supporting member 30 is provided with a pair of inserting grooves 30b which are formed at the upper portion and the lower portion of the through hole 30a, respectively. A button 31 with a pushing bar 31a and a hook 31b is assembled with the supporting member 30 and mounted on the front portion of the panel 1. Further, a hinge member 32 is protruded at the lower side of the supporting member 30 and a shutting lever 33 which is supported by a spring 34 is rotatably mounted on the hinge member 32. The upper end of the shutting lever 33 contacts with the pushing bar 31a formed with the button 31, and also the lower end of the shutting lever 33 contacts with the inclined working surface 15 of the link 14 which is connected with the operating lever 11. A fixing bar 35 is formed at the lower side of the panel 1, and the operating rib 29 is rotatably fitted with the fixing bar 35. Also, numeral 36 designates a tape cassette and the tape cassette is inserted into a cassette holder (not shown) which is mounted within the housing 2.

The operation and effect of the present invention with the above configuration will now be explained in detail.

Figure 3A:
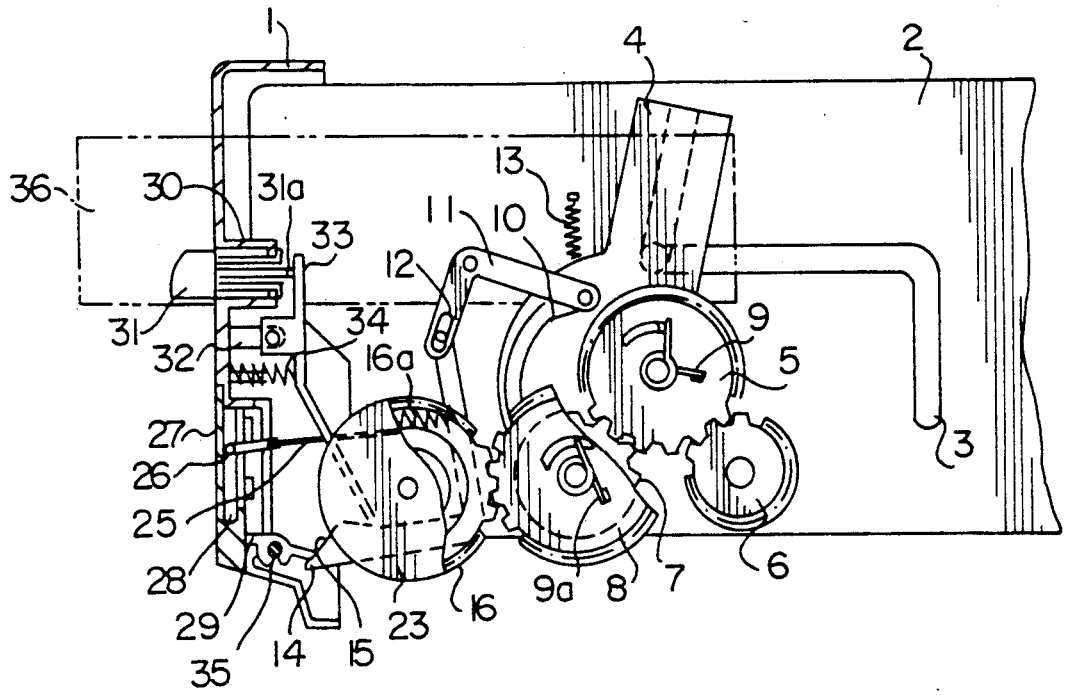
FIG. 3 (A) and (B) are side sectional views indicating the operating states of the embodiment of the present invention.

FIG. 3 shows the state in which the door 27 is shut and the tape cassette 3b is inserted into the housing 2 before the beginning of the loading operation. In this state, each element and driving means is not operated and only the tape cassette 36 is inserted into the housing 2. When the cassette 36 is completely inserted, a loading switch and a loading motor (not shown) which are mounted within the housing 2 is operated to rotate the driving gear 6. Sequentially, the connecting gear 5 in mesh with the driving gear 5 is rotated in a clockwise direction. The loading arm 4, which is concentrically provided with the connecting gear 5 and is supported by the spring 13, moves in the clockwise direction along the loading slot 3 formed in the side wall of housing 2 to load the tape cassette 36 as shown in FIG. 3(A).

When the loading arm 4 is rotated to completely load tape the cassette 36, the operating lever 11 is resiliently operated by the spring 13 and moves along the cam 10 profiled on the loading arm 4. The link 14, which is fitted with the slot 12 formed at the end of the operating lever 11, is slightly rotated in a clockwise direction. Therefore, when the link 14 is rotated, the front end of the link 14 pushes upwardly the operating rib 29 protruded at the inner side of the door 27. The operating rib 29 is rotated around the fixing bar 35 in an arrow direction as shown in FIG. 3 to open the door 27.

Figure 2:
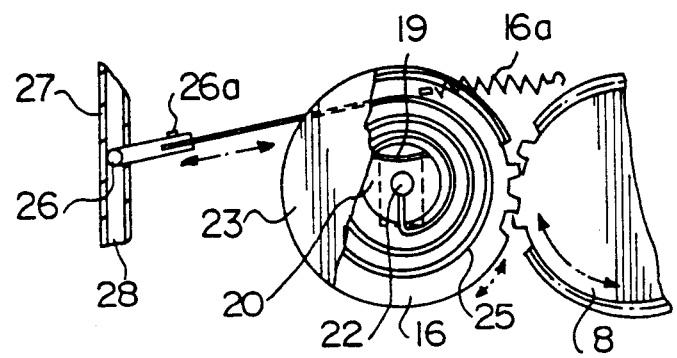
FIG. 2 is a view showing the main part of the embodiment of the present invention.

At the same time, the gear 7 in mesh with the connecting gear 5 is rotated to rotate the rotating gear 8 which is concentrically mounted with the gear 7 and resiliently supported by the spring. Further, the opening gear 16 in mesh with the rotating gear 8 at the inner side of the cover 23 is rotated and the spring 16 has a tensile force as shown in FIG. 2. The guide bar 26 moves down along the guide slot 28 at the inner side of the door to draw the spiral spring 25. The spiral spring 25 is drawn out through the aperture 24 formed at a portion of the cover 23. Each opening gear 16 and spiral spring 35 has a tensile force. Since the fixture 20 for fixing the spiral spring 25 is fixed by the regulating member 22 in contact with the resilient member 19, the fixture 20 with the regulating member 22 may be rotated in the guide hole 18 of the opening gear 16 as shown in FIG. 2, and the resilient force of the spiral spring 25 can be regulated by the rotation of the regulating member 22.

Figure 3B:
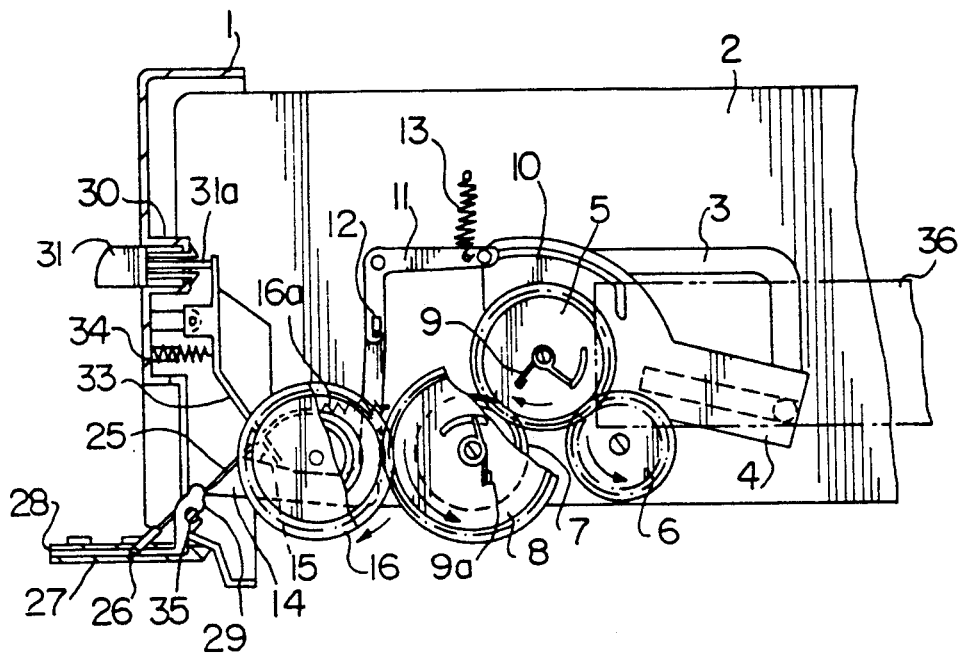

As mentioned above, when the tape cassette 36 is loaded and the door 27 is completely opened as shown in FIG. 3(B), the tape is played back to reproduce a picture or an audio signal. At this time, the picture quality or the tone quality can be adjusted by the adjusting knobs (not shown) formed in the inside of the door 27 on the panel 1.

Figure 4:
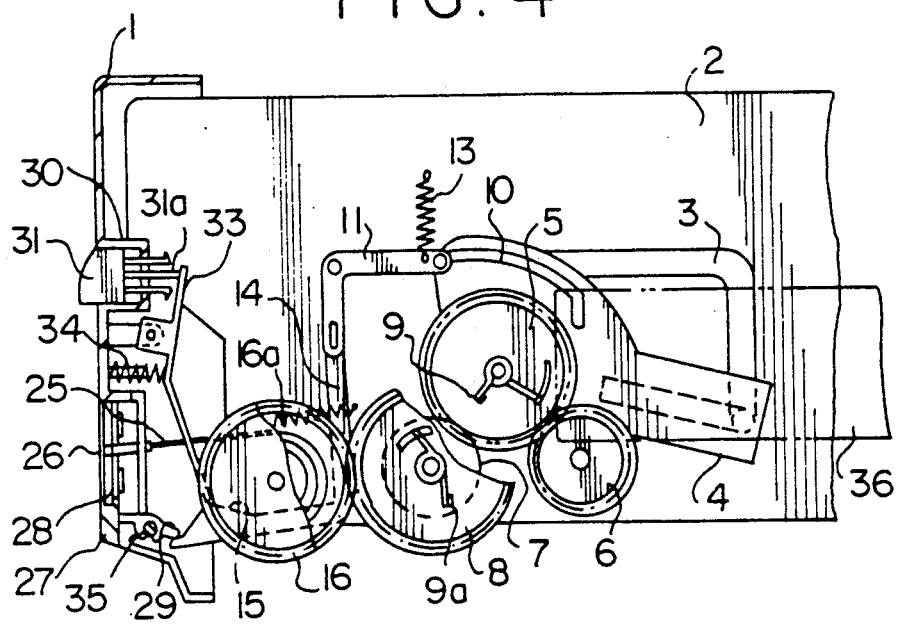
FIG. 4 is a side sectional view indicating a state in which the door is shut according to the present invention.

After completing the adjustment of the knobs, the door is again shut to maintain the adjusted state. When the button 31 provided at the upper side of the door 27 is pushed in the right direction as shown in FIG. 4, the front end of the pushing bar 31a formed with the button 31 pushes the upper portion of the shutting lever 33. Sequentially, the shutting lever 33 pushes the spring 34 and rotates around the hinge member 32 provided at the lower side of the supporting member 30. At this point, the lower end of the shutting lever 33 pushes the inclined working surface 15 to downwardly push the link 14 which is pushing the operating rib 29 of the door 27.

Accordingly, the operating rib 29 of the door 27 is released from the state locked by the front end of the link 14. As shown in FIG. 4, the door 27 is shut by the tensile force of the spiral spring 25, and the operating rib 29 is again supported by the fixing bar 25 of the panel 1.

When the door 27 is completely shut and the unloading operation is accomplished to eject the tape cassette 36, the loading arm 4 and elements for opening and shutting the door 27 are returned to the initial state according to the reverse operations. However, since the link 14 is not operated and the door 27 is again not opened, it may be accomplished to protect the adjusting part of the door 27 and to maintain the adjusted state. Also, the door 27 may not be opened until the tape cassette is once again loaded.

As mentioned above, the door may be opened to adjust the picture quality or the tone quality only in loading of the tape cassette, otherwise, the door may not be opened according to the present invention. Therefore, it may be attained to protect the adjusted state from the outside and to smoothly open and shut the door.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An apparatus for opening and shutting a door of an adjusting part, wherein functions of a tape recorder are adjusted by said adjusting part, said apparatus comprising:

cassette loading means for mounting and dismounting a cassette in a deck, said cassette loading means moving along a loading slot formed on one side of a housing, door opening means operated by said cassette loading means to open the door, resilient means for applying a resilient force to the door, control means for controlling the resilient force of said resilient means, door shutting means including a button and a shutting lever, said button beig resiliently disposed at a supporting member of a panel on an upper end of the door, said shutting lever contacting a hinge member formed in a lower part of said supporting member and contacting an inclined working surface of said link.

2. An apparatus as claimed in claim 1, wherein said door opening means includes:

a link with an inclined working surface, an operating lever resiliently provided in a cam, an operating rib, said link being connected with said operating lever to be operated by said cassette loading means and the door being opened by the interaction of said link and said operating rib, a gear resiliently disposed at one side of the housing for using in opening the door, a spiral spring, a regulating member disposed at said gear mounted within the inside of a cover, and a guide slot formed in the door to connect the spiral spring with a guide bar.

3. An apparatus as claimed in claim 1, wherein said control means includes:

a spiral spring disposed in said gear, and a resilient member inserted into a groove of said gear to control the resilient force of said spiral spring and to open and shut the door through the resilient force of said spiral spring.

4. An apparatus as claimed in claim 1, wherein said door shutting means further includes a bar disposed at a lower side of the panel for attaching an operating rib of the door.

* * * * *

UNITED STATES PATENT AND TRADEMARK OFFICE
CERTIFICATE OF CORRECTION

PATENT NO. : 5,038,238  
DATED : August 6, 1991  
INVENTOR(S) : Cheol-Kuk KIM

Page 1 of 4

It is certified that error appears in the above-identified patent and that said Letters Patent is hereby corrected as shown below:

IN THE ABSTRACT

Line 4, change "means" to --device--;

Line 5, change "means" to --device--;

Line 7, change "means being" to --device--, and change "means" (second occurrence) to --device--;

Line 8, change "means" to --device--;

Line 9, change "means" to --device--;

Line 10, change "means" to --device--;

Line 11, change "means" to --device--;

Line 12, delete "the" (second and third occurrence), and change "one" to --tone--;

Column 1, Line 10, delete "a";

Line 11, delete "a";

Line 19, change "open and shut easily" to --easily open and shut--, and change "handle" to --manipulate--;

UNITED STATES PATENT AND TRADEMARK OFFICE
CERTIFICATE OF CORRECTION

PATENT NO. :     5,038,238

DATED       :   August 6, 1991

INVENTOR(S) :   Cheol-Kuk KIM

It is certified that error appears in the above-identified patent and that said Letters Patent is hereby corrected as shown below:

Column 1,   Line 21,   change "becomes in" to --falls into--;

Line 37,   change "said " to --the--;

Line 38,   change "comprises" to --includes--, and change "means" to --device--;

Line 39,   change "said" to --the--;

Line 40,   change "means" to --device--;

Line 41,   change "means" to --device--;

Line 42,   change "said" to --the--, and change "means" to --device--;

Line 43,   change "means" to --device--;

Line 44,   change "means" to --device--;

Line 45,   change "said" to --the--, and change "means" to --device--;

Line 46,   change "means" to --device--, and change "said" to --the--;

Line 48,   change "said" to --the--.

UNITED STATES PATENT AND TRADEMARK OFFICE
CERTIFICATE OF CORRECTION

PATENT NO.   :       5,038,238
DATED        :   August 6, 1991
INVENTOR(S)  :   Cheol-Kuk KIM It is certified that error appears in the above-identified patent and that said Letters Patent is hereby corrected as shown below:

| | | |
|---|---|---|
| Column 1, | Line 50, | change "said" to --the--; |
| | Line 60, | change "a exploded" to --an enlarged--; |
| Column 2, | Line 4, | change "be now" to --now be--; |
| | Line 17, | change "provided" to --formed--; |
| Column 3, | Line 2, | change "3b" to --36--; |
| | Line 17, | change "tape the" to --the tape--; |
| | Line 32, | change "16" to --16A--; |
| | Line 37, | insert --,-- after "opening", and change "35" to --25--; |
| | Line 47, | delete "the"; |
| | Line 48, | delete "the" (first occurrence); |
| | Line 66, | change "25" to --35--; |
| Column 4, | Line 10, | delete "the" (first and second occurrence); |
| | Line 12, | delete "," (second occurrence); |
| | Line 17, | insert --the-- after "of"; |

UNITED STATES PATENT AND TRADEMARK OFFICE
CERTIFICATE OF CORRECTION

PATENT NO. : 5,038,238

DATED : August 6, 1991

INVENTOR(S) : Cheol-Kuk KIM

It is certified that error appears in the above-identified patent and that said Letters Patent is hereby corrected as shown below:

Column 4, Line 40, change "beig" to --being--;

Line 55, change "using" to --use--.

Signed and Sealed this

Second Day of March, 1993

Attest:

STEPHEN G. KUNIN

Attesting Officer

Acting Commissioner of Patents and Trademarks